United States Patent [19]

Oshima et al.

[11] 3,772,661

[45] Nov. 13, 1973

[54] CONTROL SYSTEM FOR MAGNETIC BUBBLES

[75] Inventors: Shintaro Oshima, Masashina-shi, Tokyo; Teruji Watanabe, Niza-shi, Saitama-ken; Hideo Ishihara, Kamakura-shi, Kanagawa-ken, all of Japan

[73] Assignee: Kokusai Denshin Denwa Kabushiki Kaisha, Tokyo-to, Japan

[22] Filed: Mar. 31, 1971

[21] Appl. No.: 129,705

[30] Foreign Application Priority Data

Sept. 30, 1970 Japan .............................. 45/85073

[52] U.S. Cl. .............................. 340/174 TF

[51] Int. Cl. .............................. G11c 11/14

[58] Field of Search .............................. 340/174 TF

[56] References Cited

UNITED STATES PATENTS

| | | | |
|---|---|---|---|
| 3,470,547 | 9/1969 | Bobeck | 340/174 TF |
| 3,506,975 | 4/1970 | Bobeck | 340/174 TF |
| 3,460,116 | 8/1969 | Bobeck | 340/174 TF |
| 3,543,252 | 11/1970 | Perneski | 340/174 TF |
| 3,564,518 | 2/1971 | Fisher | 340/174 TF |

*Primary Examiner*—Vincent P. Canney
*Attorney*—Robert E. Burns and Emmanuel J. Lobato

[57] ABSTRACT

A system for controlling magnetic bubbles in a thin magnetic plate comprises a plurality of drive loops disposed in close relationship to the magnetic plate and driven by polyphase drive currents to effect controlled movement of magnetic bubbles contained in the magnetic plate. The drive loops have a hexagonal shape with six sides so that a magnetic bubble may be accepted by each drive loop along one of three possible directions which are spaced apart at 120° intervals and may be transmitted therefrom along one of another three possible directions which are spaced apart at 120° intervals and which are also spaced 60° from respective ones of the first-mentioned three possible directions.

12 Claims, 41 Drawing Figures

CONTROL SYSTEM FOR MAGNETIC BUBBLES

This invention relates to a control system for magnetic bubbles in which magnetic bubbles produced in a magnetic plate having the easy magnetization direction along the direction of thickness are controlled for logical function and memory function.

In a feeble-magnetic plate (e.g.; orthoferrite $RFeO_3$; where "R" is a rare earth element) having the easy magnetization direction along the direction of thickness, a magnetic bubble can be produced under a direct-current bias field $H_b$ so as to have a magnetization directed in a direction which is reverse to the direction of the bias field. This magnetic bubble can be moved in the magnetic plate by a proper magnetic potential provided at the vicinity of the magnetic bubble. In view of the above principle, the possibility of a logical operation on the plate using mutual operations among a plurality of magnetic bubbles has been suggested. However, details for actually applicable systems are not at all known except fundamentals such as the above mentioned mutual operation among a plurality of magnetic bubbles.

An object of this invention is to provide a control system for magnetic bubbles actually applicable for many kinds of logical operations by the use of a magnetic thin plate such as orthoferrite.

The principle, construction and operation of the system of this invention will be understood from the following detailed discussion taken in conjunction with the accompanying drawings, in which.

Figure 1A:
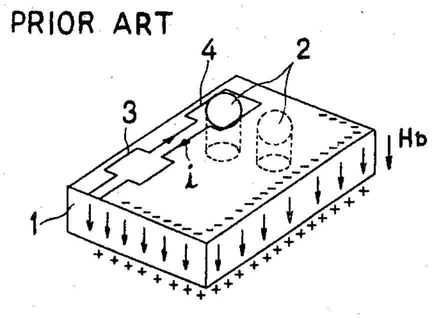
FIGS. 1A, 1B and 1C are respectively a perspective view, a block diagram and time charts explanatory of a conventional system and a system of this invention.
Figure 1B:
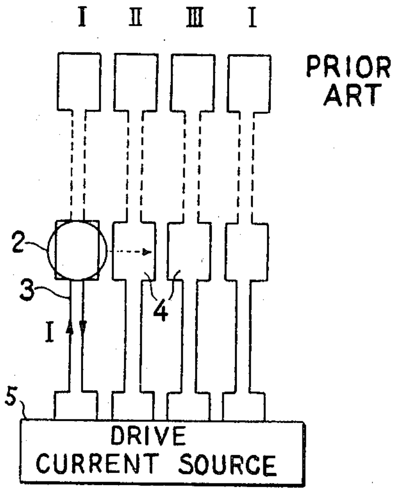
Figure 1C:
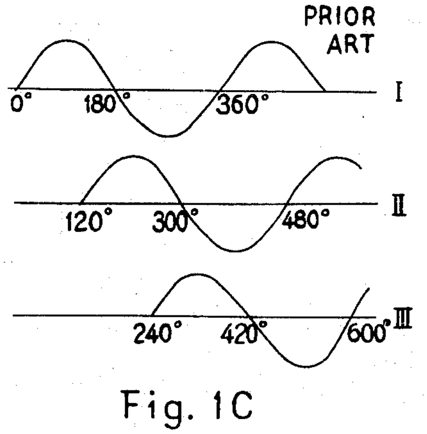

To clearly demonstrate the differences between conventional arts and this invention a conventional control system for magnetic bubbles will be described first With reference to FIG. 1A, an example of conventional systems comprises an orthoferrite thin plate 1 to which a constant dc bias field $H_b$ is applied, and a drive loop 3 is closely disposed on the surface of the plate 1. When a current $i$ is passed through the loop 3 as shown by arrows, a magnetic field is generated in a rectangular section 4 in the direction attractive of a magnetic bubble, a magnetic bubble 2 near the rectangular section 4 moves to this section 4 as shown. Accordingly, if a plurality of drive loops successively corresponding to polyphase drive currents I, II, III, I, ...as shown in FIG. 1C are provided, a magnetic bubble 2 attracted in the rectangular section 4 of the drive loop 3 for the phase I is successively attracted by the respective rectangular sections 4 of the drive loops 3 for the phases II and III as shown in FIG. 1B. In other words, the magnetic bubble 2 travels as shown by a dotted arrow.

Figure 2A:
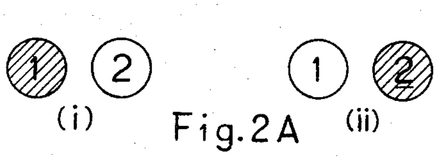
FIGS. 2A, 2B and 2C are patterns explanatory of fundamentals of magnetic bubbles.
Figure 2B:
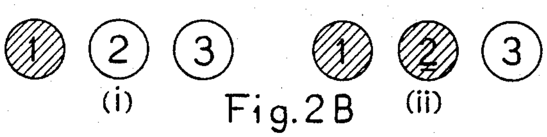
Figure 2C:
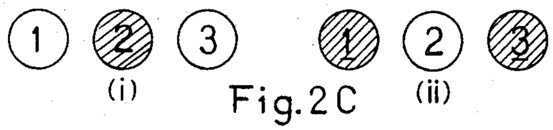

With reference to FIGS. 2A, 2B and 2C, known fundamentals of magnetic bubbles will be described. In these FIGS. 2A, 2B and 2C and other Figures in the accompanying drawings, a circle indicates a position at which a magnetic bubble provided by a drive loop as shown in FIGS. 1A and 1B may be located. In this case, a hatched circle represents a position now occupied by a magnetic bubble, while a circle without hatching represents a position now unoccupied by a magnetic bubble. Numerals (1), (2) and (3) indicated in the circles correspond respectively to the phases I, II and III of the drive currents. Symbols "—" indicated in circles are employed for showing the phase now being driven. In other words, a condition shown as a state (*i*) in each FIG. 2A, 2B or 2C is transferred to a condition shown as a state (*ii*) in response to the drive to a phase or phases indicated by the symbols "—".

As understood from the above, FIG. 2A shows a transfer of a magnetic bubble as mentioned above. Accordingly, details are omitted.

In FIG. 2B, a mutual operation is shown in which magnetic bubbles for positions (1) and (3) are attracted in response to the drive of the position (2). In this shown case, a magnetic bubble caught at the position (3) is transferred to the position (2), while a magnetic bubble caught at the position (1) remains at position (1).

In FIG. 2C, a division of a magnetic bubble is shown in which a magnetic bubble caught at a position (2) is divided into two magnetic bubbles respectively caught at positions (1) and (3).

Figure 3:
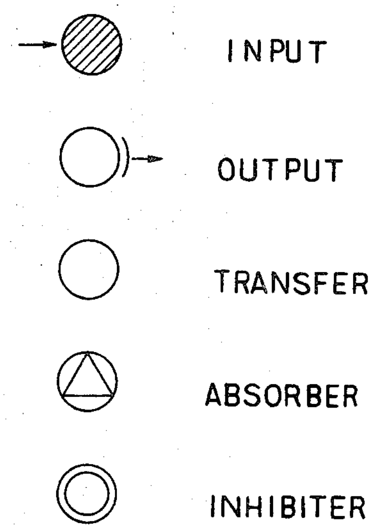
FIG. 3 is a chart of the various symbols used throughout the drawings.

In the following, the symbols shown in FIG.3 are further employed. A symbol "INPUT" represents a position to which a magnetic bubble produced in response to the drive by an external information current is located; a symbol "OUTPUT" a position from which a magnetic bubble obtained as a result of logical operation is transferred; a symbol "TRANSFER" a position for transferring a magnetic bubble; a symbol "ABSORBER" a position for transferring unnecessary magnetic bubbles to an erazing circuit; and a symbol "INHIBITER" a position employed as an inhibit gate.

In view of the above fundamentals, general operations using a plurality of positions which are respectively driven by abovementioned driving sections will be described. In this case, binary information "1" and "0" are indicated respectively by existence and nonexistence of a magnetic bubble or magnetic bubbles.

Figure 4A:
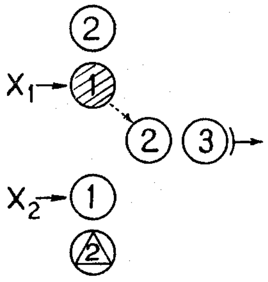
FIGS. 4A, 4B, 4C, 5A, 5B, 5C, 6A, 6B, 7A, 7B and 8A are patterns each performing a logical operation using magnetic bubbles in accordance with the present invention.
Figure 4B:
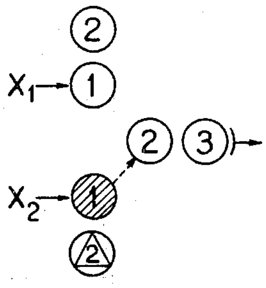
Figure 4C:
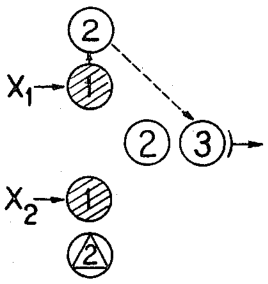
Figure 4D:
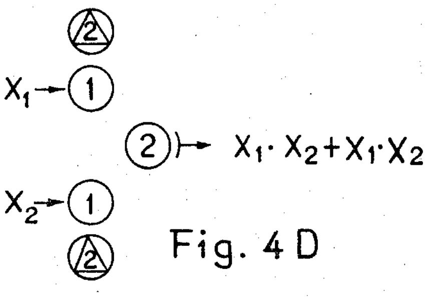

With reference to FIGS. 4A, 4B, 4C and 4D, function according to the present invention a logical OR will be described. FIGS. 4A and 4B show cases where either two inputs $x_1$ or $x_2$ assumes "1". In these cases, an input magnetic bubble is transferred to a position (2) along a dotted arrow without transfer to either an above position (2) or a lower absorber (2), and the magnetic bubble is then transferred to an output position (3). In a case shown in FIG. 4C in which both inputs $x_1$ and $x_2$ assume the state "1", a magnetic bubble caught at the position (1) in response to the input $x_1$ is absorbed by the absorber (2) while a magnetic bubble caught at the position (1) in response to the input $x_2$ is successively transferred to an above position (2) and an output position (3). In FIG. 4D, an exclusive OR circuit is shown, in which a magnetic bubble is transferred to an output position (2) if either an input $x_1$ or $x_2$ assumes the state "1", and in which both magnetic bubbles are absorbed by absorbers (2) if both inputs $x_1$ and $x_2$ assume the state "1".

Figure 5A:
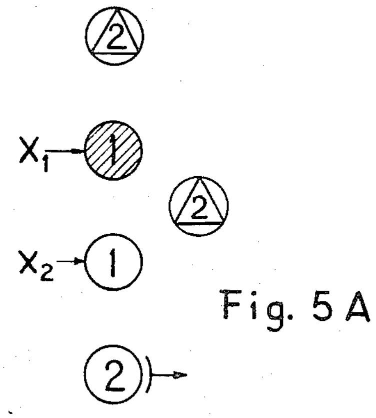
Figure 5B:
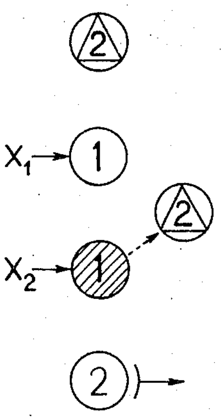
Figure 5C:
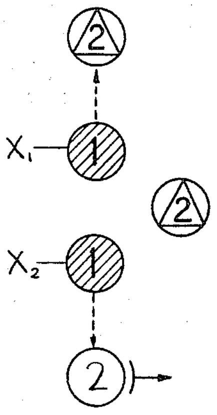

With reference to FIGS. 5A, 5B and 5C, logical AND function according to the present invention will be described. As shown in FIGS. 5A and 5B, if only one input $x_1$ or $x_2$ assumes the state "1", a magnetic bubble produced in response to the input $x_1$ or $x_2$ is absorbed by the absorber (2). If both inputs $x_1$ and $x_2$ assume the state "1" as shown in FIG. 5C an output can be obtained in response to repulsion between two magnetic bubbles produced by the inputs $x_1$ and i $x_2$.

Figure 6A:
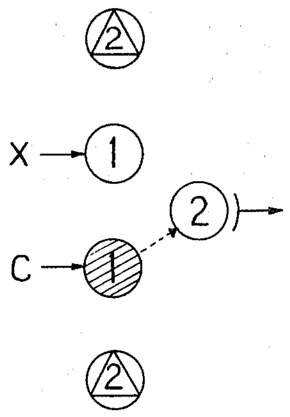
Figure 6B:
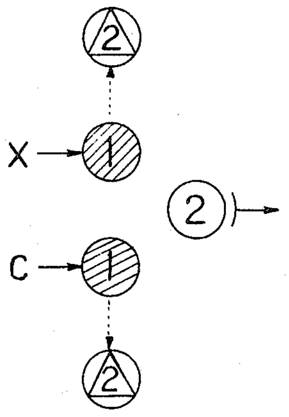

With reference to FIGS. 6A and 6B, a logical NOT function according to the present invention will be described. An input C is a constant which always assumes the state "1". If an input $x$ assumes the state "O", a magnetic bubble produced in response to the constant C is obtained from an output position (2) as shown in FIG. 6A. On the other hand, if the input $x$ assumes the state "1", no output can be obtained since two magnetic bubbles are respectively absorbed by absorbers (2).

Figure 7A:
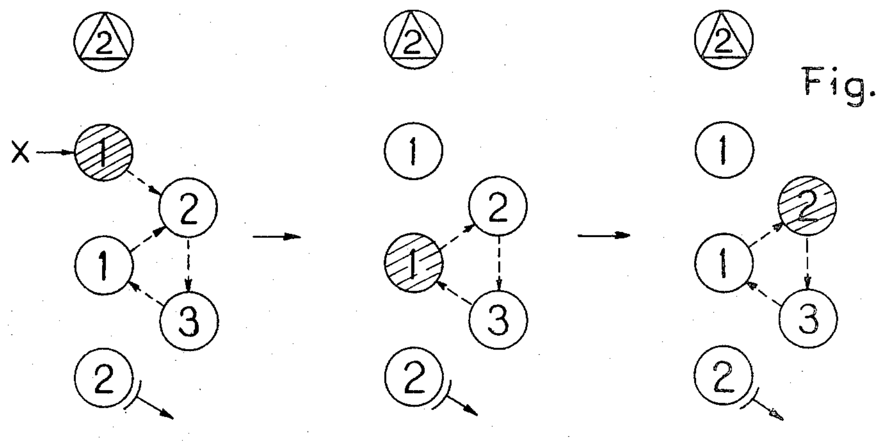
Figure 7B:
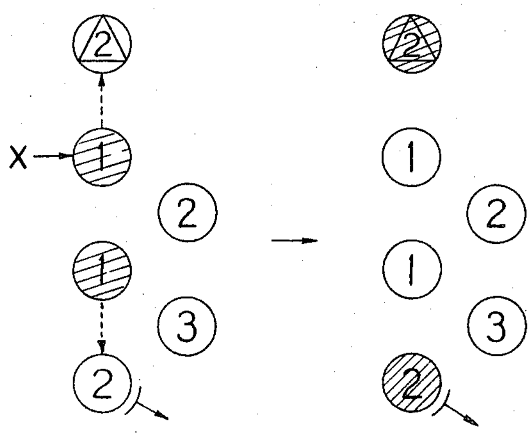

With reference to FIGS. 7A and 7B, a flip-flop circuit formed by the use of the above mentioned fundamentals will be described. In this flip-flop circuit, positions (2), (3) and (1) provides a holding loop, left positions (2), (1), (1) and (2) provides an AND circuit, center positions (1), (1) and (2) provides an OR circuit having a right position (2) as an output position, and left positions (2), (1), (1) and (2) and a right position (2) provides a NOT circuit having the right position (2) as an output position. If an input $x$ assumes the state "1"in a case where the holding loop (2), (3) and (1) is reset to the state "0", a magnetic bubble produced in response to the input $x$ is transferred through positions (2), (3), (1) and (2) so that this magnetic bubble circulates in this holding loop after terminate of the input $x$. However, if the input $x$ assumes again the state "1" as shown in FIG. 7B, magnetic bubbles repel each other so that an output assumes the state "1". Since the holding loop is reset to the state " 0" at this time, a next input $x$ of the state "1" circulates in the holding loop as mentioned above. As mentioned above, a pattern shown in FIGS. 7A and 7B operates as a flip-flop circuit having two outputs and one input.

Figures 8A, 8B:
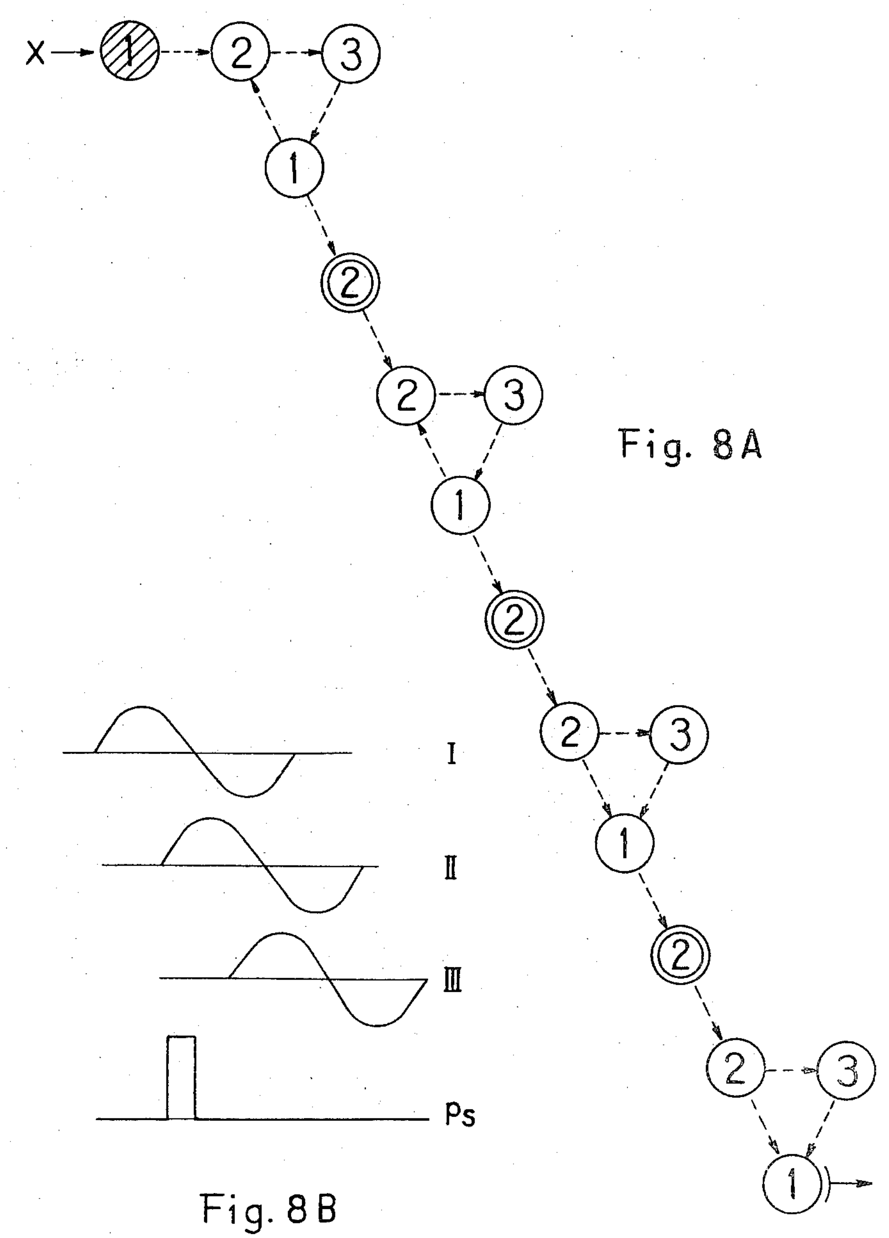
FIG. 8B is a set of time charts explaining the operation of the example shown in FIG. 8A.

In FIG. 8A, a shift register is shown in which a magnetic bubble produced in response to an input $x$ of the state "1" circulates in a first holding loop formed by positions (2), (3) and (1). If a shift pulse Ps is applied in synchronism with a drive current of the phase II as shown in FIG. 8B, the circulating magnetic bubble is shifted from the position (1) of the first holding loop, through an inhibitor (2), to a position (2) of a second holding loop formed by positions (2), (3) and (1). In this case, the first holding loop is reset to the state "0". A drive current of the phase II is applied to the absorber (2) to pass the magnetic bubble at this shift time.

Figure 9A:
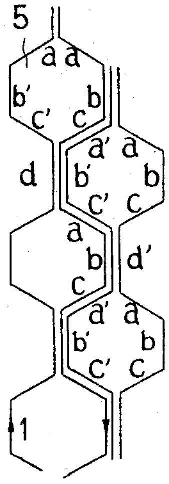
FIGS. 9A, 9B, 9C, 10A, 10B, 10C, 10D, 10E, 10F and 11 are patterns illustrating drive sections used in the system of this invention.

With reference to FIG. 9A, a pattern arrangement of drive loops according to this invention will now be described. A drive loop of this invention comprises a pair of conductors for each drive phase having widened spaces defining a hexangle arranged at regular intervals along the drive loop. Moreover, the right three sides $a$, $b$ and $c$ of a hexangle provided by one conductor of the pair of drive loop conductors are disposed along three sections $c'$, $d'$ and $a'$ respectively of an adjoining drive loop. In this case, the sections $c'$ and $a'$ belong respectively to adjacent hexangles of an adjacent drive loop while the section $d'$ is a connection section between the adjacent hexangles. The three sections $c'$, $d'$ and $a'$ comprise part of one conductor of the pair of conductors of the adjacent drive loop. In other words, the drive loops have widened spaces defining hexangles arranged in a honeycombed pattern as shown in FIG. 9A, in which each conductor of a drive loop provides three successive sides of each hexangle and each connection section between adjacent two hexangles. Accordingly, each hexangle 5 attracts a magnetic bubble.

Figure 9B:
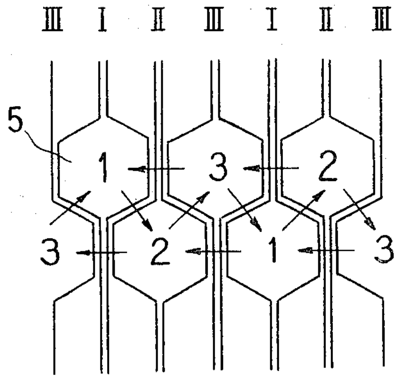

If a plurality of drive loops are provided as shown in FIG. 9B and drive currents of the phases I, II and III are applied to them as shown, a magnetic bubble can be transferred along one of three directions (shown by arrows) and angularly spaced every 120° arrows as shown in response to successive attractions by hexangle sections 5.

Figure 9C:
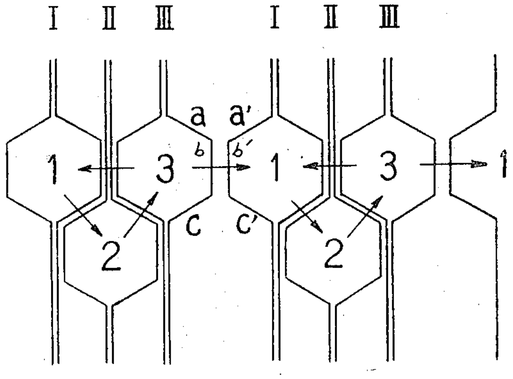

At a part of the honeycombed pattern, three sides $a$, $b$ and $c$ of a hexangle drive section may be opposed to three sides $a'b'$ and $c'$ of a hexangle drive section of an adjacent drive loop as shown in FIG. 9C.

Figure 10A:
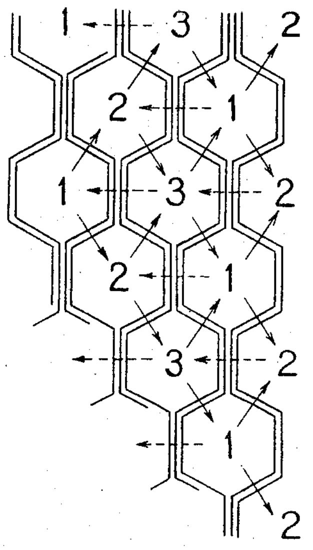
Figure 10B:
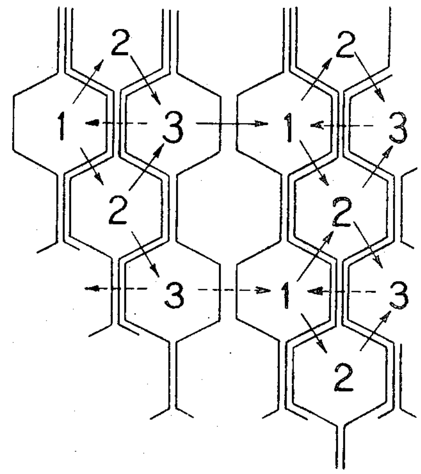

With reference to FIGS. 10A to 10F, the transfer of a magnetic bubble in accordance with this invention will be described. In the following Figures, numerals 1, 2 and 3 designated hexangle drive sections corresponding respectively to phases I, II and III of the drive current. In this case, a magnetic bubble is accepted along one of three directions which are angularly spaced every 120° and which are respectively perpendicular to alternately selected three sides of each hexangle, while the accepted magnetic bubble is transferred along one of three other directions which are angularly spaced every 120° and which are respectively perpendicular to three other sides other than the above mentioned alternatively selected three sides of the hexangle as shown in FIG. 10A. In other words, the transmissible directions are designated by arrows. In a pattern shown in FIG. 10B, a magnetic bubble is transferred from a drive section (3) driven by a drive current of phase III to a drive section (1) of right hand driven by a drive current of phase I. In this case, transfer of the magnetic bubble to the drive section (1) is performed along one of three directions respectively perpendicular to alternately selected three sides of the hexangle drive section (1), while retransfer of the transferred magnetic bubble is performed in one of two remainders thereof as shown in FIG. 10B.

Transfer of a magnetic bubble in a direction shown by a dotted arrow in FIGS. 10A and 10B intersects a pair of drive conductors excited by a drive current of a phase (e.g.; the phase II) in a direction repelling the magnetic bubble in a case of transfer between two drive sections excited by drive currents of other phases (e.g.; the phases I and III). Accordingly, if the width of the drive conductor for the drive current of the phase II is relatively large, a magnetic field acting in the direction repelling the magnetic bubble is not negligible. In this case, this magnetic field can be compensated by a control line as mentioned below so as to perform the transfer from a drive section driven by a drive current of the phase III to a drive section driven by a drive current of the phase I.

With reference to FIGS. 10C, 10D, 10E and 10F, examples are shown of an actual means for determining a transfer direction of a magnetic bubble from a plurality of possible directions in a case where a drive section is close to simultaneously driven two drive sections.

Figure 10C:
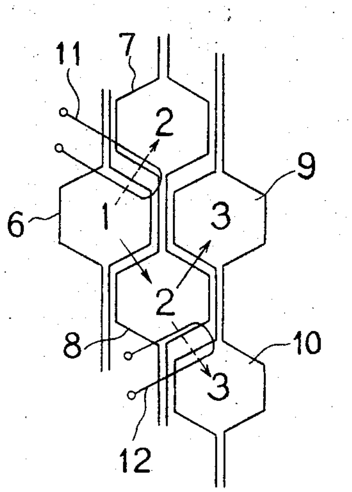

In FIG. 10C, a transfer direction is determined by differentiating the distances between respective pairs of adjacent drive sections. A distance between adjacent drive sections 6 and 7 is larger than a distance between adjacent drive sections 6 and 8, so that a magnetic bubble caught by the drive section 6 is transferred to the drive section 8 without transfer to the drive section 7. In this case, a control conductor 11 may be provided to reduce the time for transferring a magnetic bubble from the drive section 6 to the drive section 8, so that a current is passed through the control conductor 11 so as to generate a magnetic field at the same time of the drive current of the phase II in the reverse direction of a magnetic field generated in the drive sections 7 and 8 by the drive current of the phase II. Similarly to the above, a magnetic bubble caught by the drive section 8 is transferred to a drive section 9 without transfer to the drive section 10.

However, a magnetic bubble caught by the drive section 6 can be transferred to the drive section 7 if a control current having the same phase as or a phase slightly advanced from the phase Ii is passed through the control conductor 11 so as to generate a magnetic field in the same direction as the magnetic field generated in the drive sections 7 and 8. As a result of this function, a magnetic bubble is transferred from the drive section 6 to the drive section 7 as shown by a dotted arrow since the magnetic field caused by the control conductor 11 attracts the magnetic bubble in advance to the drive by the drive current of the phase II. If this principle of operation is applied to a control donductor 12, a magnetic bubble caught by the drive section 8 can be transferred to the drive section 10 as shown by a dotted line.

Figure 10D:
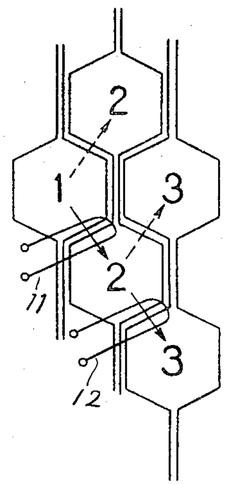

FIG. 10D shows another example of the actual means for determining a transfer direction of a magnetic bubble. In this example, the transfer direction is controlled only by the use of control conductors (11, 12, ..) without differentiation between respective distances for pairs of adjacent drive sections. These control conductors 11 and 12 are controlled in the same manner as the control conductors 11 and 12 employed in the example shown in FIG. 10C. In view of the principle as described above, the control conductors (11, 12) may be provided on a separate sheet of insulator other than the substrate on which the pattern of drive loops are deposited. In this case, respective positions of the control conductors (11, 12, ....) can be provided at desired positions so as to perform a desired logical operation without change of the pattern of the drive loops.

Figure 10E:
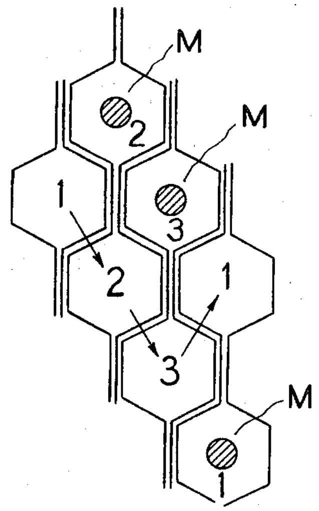

In an example shown in FIG. 10E, small thin spots M of magnetic substance (e.g.; permalloy) are provided at necessary drive sections to attract or repel a magnetic bubble so as to determine the transfer direction of the magnetic bubble. If the thin spots M are magnetized so as to repel the magnetic bubble, a magnetic bubble is transferred along drive sections having the small thin spots M as shown in FIG. 10E. As readily understood from the above, if the small thin spots M are magnetized so as to attract a magnetic bubble, a magnetic bubble can be transferred along drive sections having the small thin spots M.

Figure 10F:
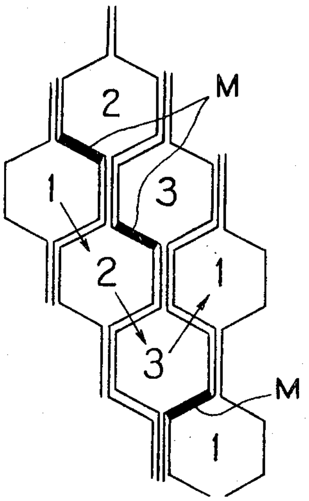

In an example shown in FIG. 10F, small segments M of magnetic substant (e.g.; permalloy) are provided at necessary spaces between respective adjacent drive sections to perform the function similar to the small thin spots M.

The above mentioned magnetic substance can be provided by the use of photo-etching techniques at necessary positions. Moreover, the spots or segments of magnetic substance may be provided on a separated sheet of insulation other than a substrate, on which the pattern of the drive loops are deposited.

Figure 11:
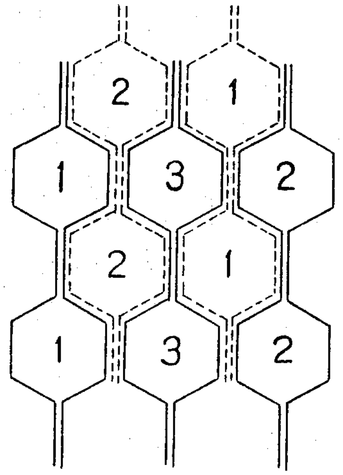

In an actual example of the device of this invention, the patterns of drive loops need not be provided on one surface only of a magnetic thin plate. All the pattern of drive loops may be divided into two parts respectively indicated by solid lines and dotted lines as shown in FIG. 11, so that the two parts are respectively provided at two surfaces of the magnetic thin plate so as shown in FIG. 11.

Figure 12:
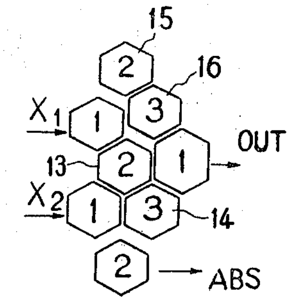
FIGS. 12, 13, 14, 15A, 15B, 16, 17 and 18 are patterns each illustrating drive sections and control means for performing a fundamental logical operation in accordance with this invention.
Figure 13:
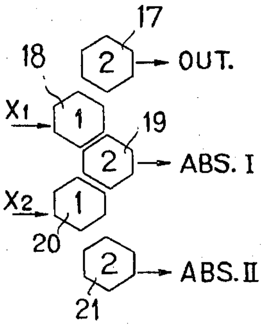
Figure 14:
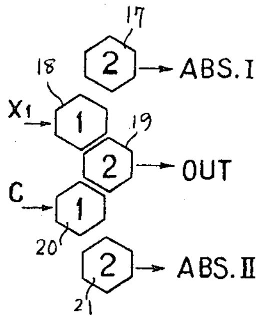

With reference to FIGS. 12, 13 and 14, examples of drive loops employed in the system of this invention will now be described. In these examples, each hexangle indicates a drive section as described with reference to FIGS. 9A to 11, while connection sections between adjacent drive sections excited by the same drive current are omitted for the sake of clarity. Moreover, output drive sections of a preceding stage producing inputs $x_1$ and $x_2$ are omitted together with drive sections of a succeeding stage connected to an output "OUT" and an absorber "ABS". Reference numerals "1", "2" and "3" correspond respectively to the phases I, II and III of drive currents.

FIG. 12 is an example of drive loops for performing logical OR. If either input $x_1$ or $x_2$ assumes the state "1", a magnetic bubble produced by the input $x_1$ or $x_2$ of the state "1" is transferred through drive sections 13, 14 and "OUT" as mentioned with reference to FIGS. 4A and 4B. However, if both inputs $x_1$ and $x_2$ assume the state "1", magnetic bubbles produced by the inputs $x_1$ and $x_2$ of the state "1" are repelled each other, so that a magnetic bubble produced by the input $x_2$ is transferred to the absorber "ABS" while a magnetic bubble produced by the input $x_1$ is transferred through drive sections 15 and 16 to the output "OUT". To exactly perform the above-mentioned operations, respective spaces between an input section of the input $x_1$ and the drive section 13 and between an input section of the input $x_2$ and the drive section 13 are narrower than a regular space, while respective spaces between the input section of the input $x_2$ and the absorber "ABS" and between the input section of the input $x_1$ and the drive section 15 are wider than a regular space. Control conductors or small segments as mentioned with reference to FIGS. 10C, 10D and 10F may be employed for the above mentioned adjastment by spaces between drive sections.

FIG. 13 shows an example of drive loops for performing the logical AND function. To perform the AND function described with reference to FIGS. 5A, 5B and 5C, respective spaces between an input section 18 of an input $x_1$ and an absorber "ABS I" (19) and between an input section 20 of an input $x_2$ and an absorber "ABS II" (19) are narrow while respective spaces between the input section 18 of the input $x_1$ and an output section 17 and between the input section 20 of the input $x_2$ and an output section 21 are wide.

FIG. 14 shows an example of drive loops for performing logical NOT. This pattern of drive sections shown in FIG. 14 are the same as the pattern of drive section shown in FIG. 13. However, a constant input C is applied to the input section 20 instead of the input $x_2$ while the absorber "ABS. I" and the output "OUT" are replaced by each other with respect to the drive sections 17 and 19. If an input $x_2$ is applied to the input section 20 instead of the constant input C, an EXCLUSIVE OR circuit as mentioned with reference to FIG. 4D can be obtained.

Figures 15A, 15B, 16:
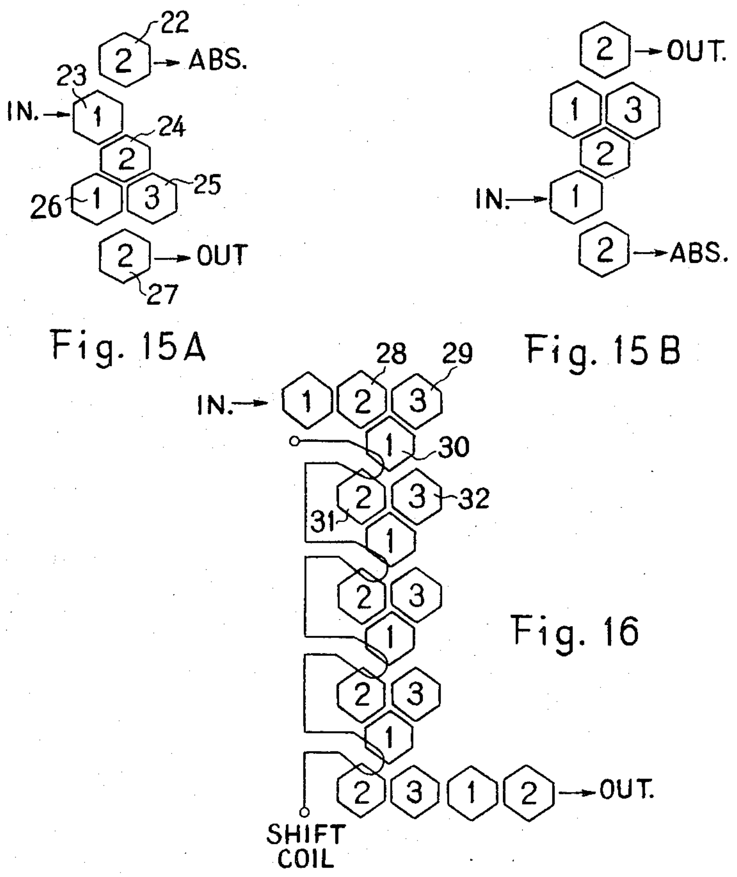

FIGS. 15A and 15B show examples of drive loop patterns designed by the use of the above fundamentals for performing Flip-Flop function. As understood from the Flip-Flop function described with reference to FIGS. 7A and 7B, sections 24, 25 and 26 shown in FIG. 15A provide a holding loop; an absorber 22, and input section 23, a drive section 26 and an output section 27 provide an AND circuit; the input section 23 and the drive sections 24 and 26 provide an OR circuit having an output of the drive section 24; and the absorber 22, the input section 23, the drive sections 24 and 26 and the output section 27 provide a NOT circuit having an output of the drive section 24. Accordingly, respective spaces between sections 23 and 24, between sections 24 and 25, between sections 25 and 26, and between sections 26 and 24 are narrow, while respective spaces between sections 22 and 23, between sections 26 and 27, and between sections 25 and 27 are wide.

In FIG. 15B, a pattern of drive loops for performing the same function as the pattern shown in FIG. 15A is illustrated. As understood from the two patterns shown in FIGS. 15A and 15B, a pattern employed in the system of this invention for performing a required function has at least one modification in view of the fundamentals of hexangle drive sections.

FIG. 16 shows an example of a pattern of drive loops employed in the system of this invention for providing a shift register. As understood from the fundamentals described with reference to FIG. 8, drive sections 28, 29 and 30 closely disposed to one another provide a holding circuit. However, respective spaces between the drive section 30 and each of sections 31 and 32 which belong to a next holding loop are wide, so that when a shift pulse is applied to a shift coil in synchronism with the drive current of the phase II, a magnetic bubble held in the drive section 30 is shifted to the drive section 31. A magnetic bubble circulates in a holding loop except the application of the shift pulse into the shift coil in synchronism with drive pulse of the phase II. An input is applied to a first holding loop formed by the drive sections 28, 29 and 30 through an input section. An output is derived from a last holding loop through output sections successively driven.

Figures 17, 18:
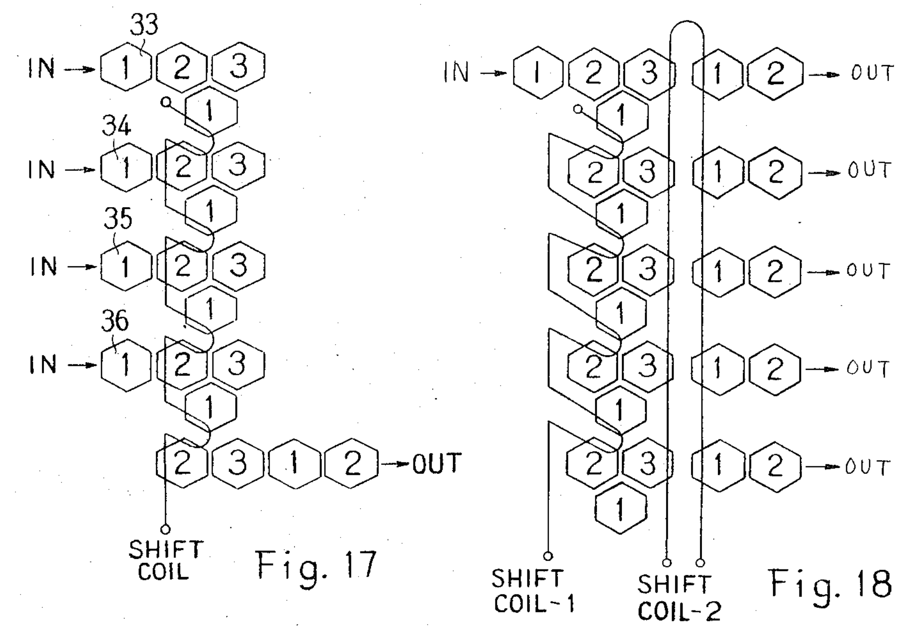

FIG. 17 shows an example of a pattern of drive loops employed in the system of this invention for providing a parallel-serial signal converter. A parallel signal of four bits is applied to input sections 33, 34, 35 and 36 for bit and converted to a serial signal by applying the above mentioned shift pulses to the shift coil.

FIG. 18 shows an example of a pattern of drive loops employed in the system of this invention for providing a serial-parallel signal converter. A serial signal of five bits is applied to an input section in a manner similar to the shift register described with reference to FIG. 16 in controlling by the shift coil-1. When all the holding loops are occupied by bits of the input signal, a shift pulse is applied to a shift coil-2 so as to obtain a parallel signal of five bits from five output sections "OUT".

The above-mentioned patterns each designed for performing a fundamental logical operation can be combined to provide a more complex pattern which can perform complex logical operations.

Figure 19:
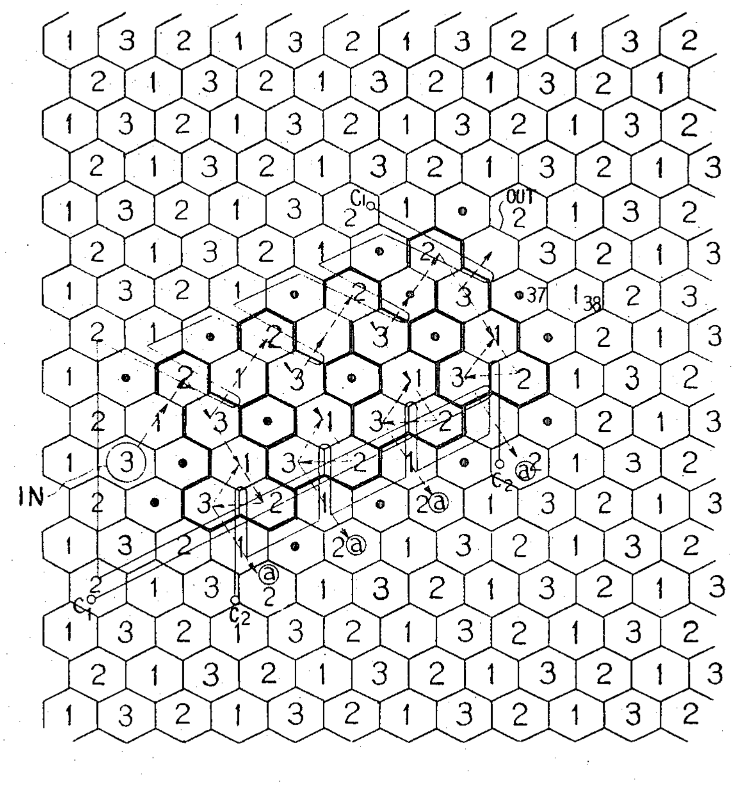
FIG. 19 is a pattern illustrating drive sections and control means for performing a counting operation in accordance with this invention.
Figure 20:
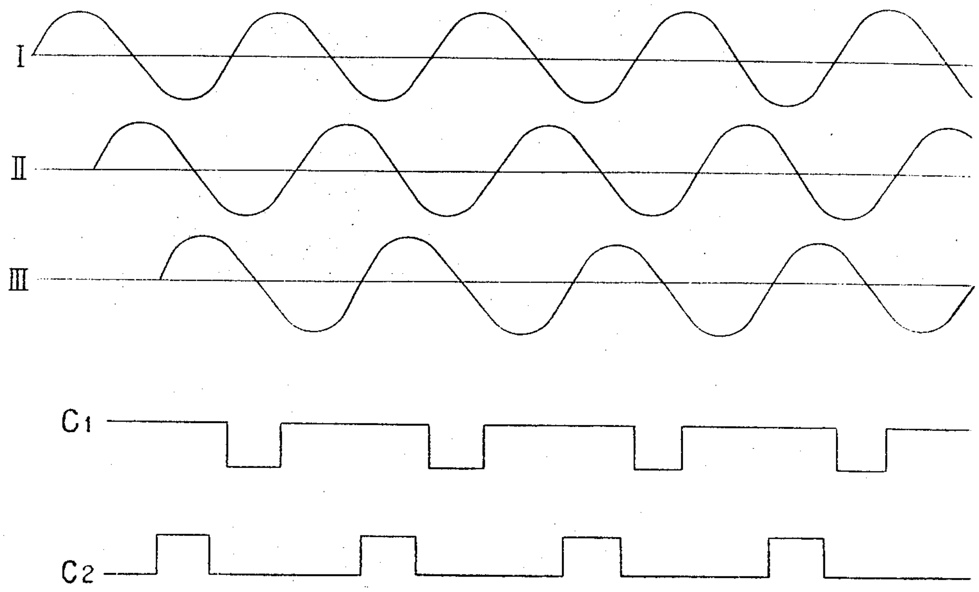
FIG. 20 is a set of time time charts explaining of the operation of the example shown in FIG. 20.

FIG. 19 is a pattern employed to provide a scale-of-16 counter formed by a cascade connection of four Flip-Flop circuits each as mentioned with reference to FIGS. 15A and 15B. In this counter, two control lines $C_1$ and $C_2$ are provided. Currents I, II and III shown in FIG. 20 are employed as drive currents of phases I, II and III. Currents $c_1$ and $c_2$ shown in FIG. 20 are employed as respective control currents of the control lines $C_1$ and $C_2$, so that the control line $C_1$ generates magnetic fields to check transfer from each drive section of the phase III to each drive section of the phase I while the control line $C_2$ generates magnetic fields to render backward transfer of magnetic bubbles held in drive sections under the phase II as shown by dotted arrow. Small segments 37 and small spots 38 are of ferromagnetic substance and employed to check transfer of magnetic bubbles as mentioned with reference to FIGS. 10E and 10F.

Figure 21:
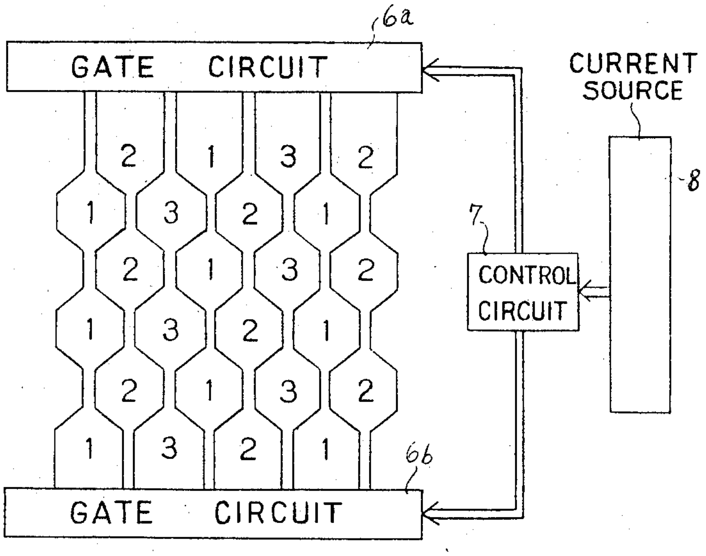
FIG. 21 is a block diagram illustrating another example of the pattern of drive loops used in the system of this invention.

In the above example, each drive loop comprises a pair of independent conductors having hexangular drive sections arranged therealong at regular inervals. However, each conductor may be used for providing adjacent drive sections respectively driven by different drive currents of consecutive phases. An example of thin type of the system of this invention is shown in FIG. 21, in which gate circuits 6*a* and 6*b* operate in combination so as to successively form respective pairs of loops for the phases I, II and III as shown under control of a control circuit 7, which receives drive currents of the phases I, II and III and other necessary control currents.

As mentioned above, since the pattern of drive loops used in the system of this invention comprises a number of hexangles which can be densely arranged on a surface of a substrate, coeficient of utilization for the surface of the substrate is very high. Moreover, many kinds of logical operations can be designed independently of the pattern of drive loops by suitable selection of control patterns, such as the above mentioned small spots or small segments or other adjustment means, which are provided on a separate substrate other than a substrate of the drive loop pattern. Accordingly, a change of the control pattern will readily provide many kinds of logical operation circuits. From the production point of view, the magnetic thin plate, the drive loop pattern and the control pattern can be readily produced by the use of vacuum evaporative deposition techniques, photo-etching techniques and other integrated circuit techniques. Accordingly, the system of this invention is suitable to mass production and for a full magnetic computer.

What we claim is:

1. A system for controlling magnetic bubbles in a thin magnetic plate by the use of a plurality of drive loops closely disposed to the thin magnetic plate and driven by poly-phase drive currents, the drive loops comprising a pair of drive conductors for each phase of drive current and having at regular intervals therealong widened drive sections each defining one drive loop so that a magnetic bubble caught by one of the drive sections of the drive loops may be transmitted along one of a first three possible directions which are spaced apart at 120° intervals while a magnetic bubble may be accepted by one of the drive sections of the drive loops along one of a second three possible directions which are spaced apart at 120° intervals and which are spaced 60° from respective ones of the first three possible directions.

2. A system according to claim 1, wherein each conductor of the drive conductors runs along successive three sides of each of a plurality of hexangle drive sections, whereby the pattern of the drive loops defines a honeycombed pattern.

3. A system according to claim 2, in which two of said successive three sides of one of said hexangle drive sections are opposed to respective one sides of adjacent two hexangle drive sections driven by a drive current of adjacent phase.

4. A system according to claim 3, in which respective spaces between two pairs of said opposed sides are different from each other.

5. A system according to claim 3, in which further comprising means of magnetic substance for determining a particular transfer direction of each magnetic bubble.

6. A system according to claim 2, in which a pair of said drive conductors for each phase of drive current comprises independent conductors for each phase of drive current.

7. A system according to claim 2, in which respective ones of a pair of said drive conductors for each phase of drive current are provided commonly to respective conductors for respective adjacent phases of drive currents, and in which further comprising means for changing combinations of said pair of drive conductors so that each conductor is used for providing adjacent drive sections respectively driven by different drive currents of consecutive phases.

8. A system comprising: a thin magnetic plate in which magnetic bubbles may be introduced and moved; means for moving magnetic bubbles contained in said magnetic plate between a series of stable positions comprising a plurality of drive loops disposed in close proximity to said magnetic plate and cooperative therewith to define therein said series of stable positions, each drive loop having means operative when said drive loop is energized for effecting movement of a magnetic bubble into its corresponding stable position along one of three discrete paths and for effecting movement of the magnetic bubble out of its corresponding position along one of three different discrete paths; and means for selectively energizing said drive loops during operation of the system to effect controlled movement of the magnetic bubble between said stable positions.

9. A system according to claim 8; wherein each drive loop has a polygonal configuration composed of six linear sections each extending perpendicular to one of said discrete paths.

10. A system according to claim 8; wherein each drive loop comprises a pair of drive conductors collectively defining a nexagonal configuration having six linear sections.

11. A system according to claim 10; wherein said plurality of drive loops are disposed in an array of mutually adjacent drive loops wherein two of the six linear sections of some drive loops are each opposed to one of the six linear sections of another adjacent drive loop.

12. A system according to claim 11; wherein the spacing distance between the opposed linear sections of adjacent drive loops is different for some of said drive loops.

* * * * *